United States Patent [19]

Breeden et al.

[11] Patent Number: 5,315,637
[45] Date of Patent: May 24, 1994

[54] APPARATUS AND METHOD FOR CONTROLLING THE ROUTING OF INCOMING CALLS IN A WIRELESS COMMUNICATION SYSTEM

[75] Inventors: Robert L. Breeden, Boca Raton; Prabhakar Muppidi, Lake Worth, both of Fla.

[73] Assignee: Motorola, Inc., Schaumburg, Ill.

[21] Appl. No.: 877,293

[22] Filed: May 1, 1992

[51] Int. Cl.$^5$ .................................... H04M 11/00
[52] U.S. Cl. .................................. 379/58; 379/62; 379/63
[58] Field of Search ............................. 379/58–63; 455/33.1, 54.1, 56.1

[56] References Cited

U.S. PATENT DOCUMENTS

| | | | |
|---|---|---|---|
| 4,833,701 | 5/1989 | Comroe et al. | 379/60 |
| 4,881,271 | 11/1989 | Yamauchi et al. | 379/60 |
| 4,887,265 | 12/1989 | Felix | 379/59 |
| 4,955,050 | 9/1990 | Yamauchi | 379/59 |
| 5,040,177 | 8/1991 | Martin et al. | . |
| 5,251,248 | 10/1993 | Tokunaga et al. | 379/62 |

FOREIGN PATENT DOCUMENTS

| | | | |
|---|---|---|---|
| 0459337 | 12/1991 | European Pat. Off. | 379/58 |
| 0195248 | 8/1991 | Japan | 379/58 |

OTHER PUBLICATIONS

ISDN Concepts, Facilities and Services, by Gary C. Kessler, pp. 52–53, U.S.A. Electrical Commutation, vol. 63, No. 4, "Cellular Mobile Radio as an Intelligent Network Application," Ballard et al.

Primary Examiner—Curtis Kuntz
Assistant Examiner—Dwayne D. Bost
Attorney, Agent, or Firm—R. Louis Breeden; Thomas G. Berry

[57] ABSTRACT

A wireless communication system (WCS) comprises a plurality of portable communication units (PCUs) (109) each PCU having a telephone number for receiving incoming calls. The WCS is coupled to the public switched telephone network (PSTN) (106), and has a plurality of locations (102) defined by radio coverage of a plurality of fixed communication units (FCUs) (108) at each location. The FCUs (108) are coupled to the PSTN, each FCU having at least one transceiver channel, and each transceiver channel having a telephone access number. The WCS further comprises a routing controller (RC) (104) for routing (514) incoming calls for PCUs, a location database (116) for storing (408) information used in the routing, and a plurality of location controllers (LCs) (110) each assigned an identification. One LC is at each location and is coupled to the FCUs thereat. The LCs communicate (304, 602, 604) with the RC and control (610, 612) the FCUs in response to messages (410, 412, 510) from the RC.

14 Claims, 6 Drawing Sheets

APPARATUS AND METHOD FOR CONTROLLING THE ROUTING OF INCOMING CALLS IN A WIRELESS COMMUNICATION SYSTEM

FIELD OF THE INVENTION

This invention relates in general to radio communication systems, and more specifically to two-way radio communication systems that support inbound calling from the public switched telephone network.

BACKGROUND OF THE INVENTION

Two-way wireless communication systems (WCS) that support inbound calling from the public switched telephone network (PSTN) are well known to those skilled in the art. Examples of such systems include cellular telephone systems and trunked radio systems. In addition to using the PSTN for the transport of calls to and from the WCS, these conventional systems require dedicated, complex centralized switching systems having special controllers for routing the calls. The switching systems are coupled to each of a small plurality of radio transmission sites comprising the fixed part of the WCS.

Simpler, less expensive two-way WCSs have recently become available. An example is the Motorola S35XGB1602AP telepoint base station manufactured by Motorola, Inc. of Schaumburg, Ill. That system comprises a plurality of fixed communication units (FCUs) at a plurality of locations called "telepoints." Each telepoint usually has from two to six FCUs, each FCU being coupled to the PSTN by a telephone line. Each telepoint also comprises at least one location controller (LC) for controlling and coordinating the FCUs at the telepoint.

The FCUs are low power radio transceivers having a maximum communicating range of about 150 meters. A typical large city requires thousands of telepoints for good coverage, but the price of telepoint equipment is low enough to justify the quantity. Additionally, the low power allows frequent reuse of a relatively small amount of radio spectrum to provide a relatively large amount of communication capacity. Thus, unlike cellular and trunked radio systems that use higher power, the telepoint systems can serve large numbers of users in densely populated metropolitan areas.

To use the telepoint for communication a user must be within range and must possess a compatible portable communication unit (PCU). An example is the Motorola S35XCD1000AA personal telephone manufactured by Motorola, Inc. of Schaumburg, Ill. This PCU is a highly portable unit that is more easily transported in one's pocket or purse than conventional cellular PCUs. Because of the low power requirements of the telepoint compatible PCU, it also exhibits a much greater battery life than conventional cellular PCUs.

Unfortunately, conventional telepoint systems do not provide incoming call capability. That is, a telepoint user may originate a call to any destination reachable by the worldwide PSTN, but may not receive any calls. A partial solution to this limitation is for a user to subscribe to a radio paging service and carry a radio pager having a numeric or alphanumeric display in addition to carrying the telepoint PCU. That way, the user can be paged when someone wants to communicate and can subsequently return the call to the number displayed on the pager. For greater convenience there are telepoint compatible PCUs having built-in radio pagers now available. Still, the inability of telepoint users to directly receive incoming calls is viewed by many users as an undesirable limitation.

While it perhaps would be technically possible to use the centralized switching system approach described earlier for routing inbound calls, the large number of telepoints makes this approach economically impractical. Such an approach typically would require thousands of dedicated telephone circuits between the switching system and the telepoint FCUs. A telepoint system is not like a cellular system, which has a far smaller number of radio transmission sites to be interconnected.

Thus what is needed is a way of directly routing inbound calls to telepoint PCUs without requiring a radio paging system including radio pagers, without requiring any additional dedicated switching equipment, and without requiring numerous additional dedicated telephone circuits.

SUMMARY OF THE INVENTION

A wireless communication system comprises a plurality of portable communication units (PCUs) each PCU having a unique PCU identification code and each PCU assigned a unique PCU telephone number for receiving incoming calls. The wireless communication system is coupled to the public switched telephone network (PSTN) for transporting calls to and from the PCUs, and has a plurality of locations. Each location comprises a plurality of fixed communication units (FCUs), each FCU being coupled to the PSTN, each FCU having at least one transceiver channel, and each transceiver channel having a unique telephone access number. The wireless communication system further comprises a routing controller (RC) for controlling the routing of incoming calls for PCUs and for generating access request messages in response thereto. The wireless communication system still further comprises a location database coupled to the RC for storing information used in controlling the routing of the incoming calls for the PCUs, and a plurality of location controllers (LCs). Each of the LCs is uniquely assigned an LC identification code, and one LC is located at each of the plurality of locations and is coupled to the plurality of FCUs at each location. The LCs function to establish communications with the RC and control each of the plurality of FCUs at each location in response to the access request messages from the RC.

DESCRIPTION OF A PREFERRED EMBODIMENT

Figure 1:
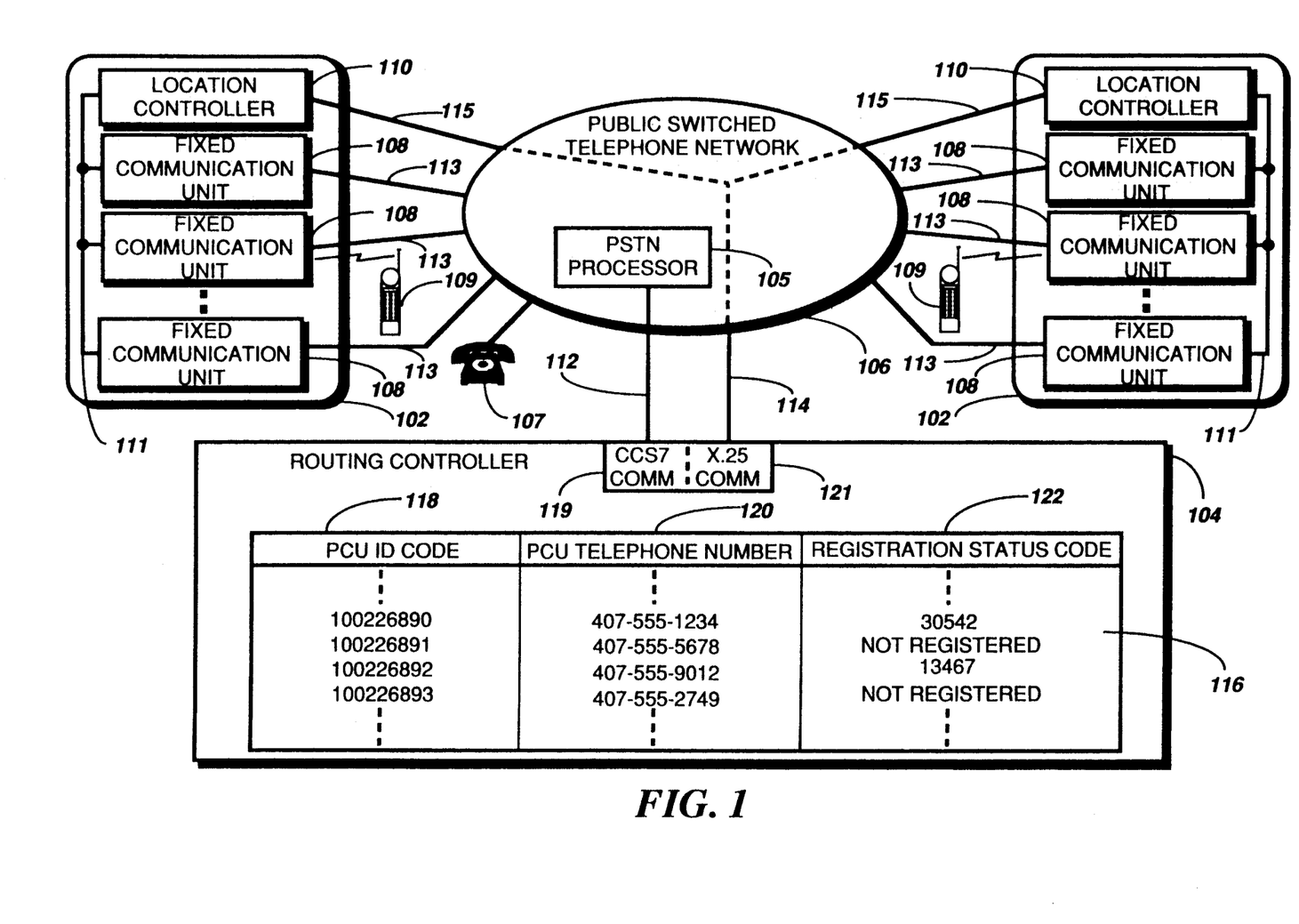
FIG. 1 is a block diagram of a wireless communication system in accordance with a preferred embodiment of the present invention.

Referring to FIG. 1, the block diagram of a wireless communication system in accordance with a preferred embodiment of the present invention comprises a plurality of portable communication units (PCUs) 109, each PCU 109 having a unique PCU identification code and each PCU assigned a unique PCU telephone number for receiving incoming calls. The wireless communication system is coupled to the PSTN 106 for transporting calls to and from the PCUs 109, and comprises a plurality of locations 102 defined by a radio coverage area for a plurality of fixed communication units (FCUs) 108 at the location, each FCU having two transceiver channels capable of handling two independent calls simultaneously. The wireless communication system further comprises at least one wired telephone 107 coupled to the PSTN 106 for communicating with the PCUs.

The FCUs are coupled to the PSTN 106 by ISDN Basic Rate Interface (BRI) links 113, each comprising a "D" channel supporting PSTN signaling and two "B" channels, each B channel supporting a two-way voice or data signal. Each of the B channels is accessible by a unique telephone number, thus allowing each of the two transceiver channels of the FCU to have a unique telephone access number. Each location further comprises an LC 110 coupled to the FCUs 108 at the location by a bus 111 for controlling the FCUs at the location. The LC 110 is coupled to the PSTN 106 by an X.25 link 115 for communication with the RC 104.

The RC 104 for controlling the routing of incoming calls for the plurality of PCUs 109 comprises a data processing computer hardware platform with custom software to perform the RC functions. An example of such a data processing computer is the Stratus Model 75 computer, manufactured by Stratus Computers, Inc., of Marlboro, Mass. The RC 104 comprises a database 116, a first communications port 119 compatible with the Common Channel Signaling System Number Seven (CCS7) protocol, and a second communications port 121 compatible with the X.25 protocol. Both of these protocols are well known to those skilled in the art of communications protocols. The database 116 comprises storage means for values comprising a plurality of pre-programmed PCU identification codes 118 and a plurality of corresponding pre-programmed PCU telephone numbers 120 to form a plurality of PCU "identity pairs." In addition there is a plurality of reprogrammable registration status codes 122, each of which corresponds to a PCU identity pair for indicating the registration status of the PCU identified by the corresponding PCU identity pair.

The first communications port 119 is coupled to a PSTN processor 105 by a CCS7 link 112 and handles communications with the PSTN processor 105 for sending call routing information to the PSTN 106 in response to call routing requests from the PSTN 106. The second communications port 121 does not communicate directly with the PSTN processor 105 but uses an X.25 link 114 coupled through the PSTN 106 to communicate with the LCs 110 at the locations 102.

Figure 2:
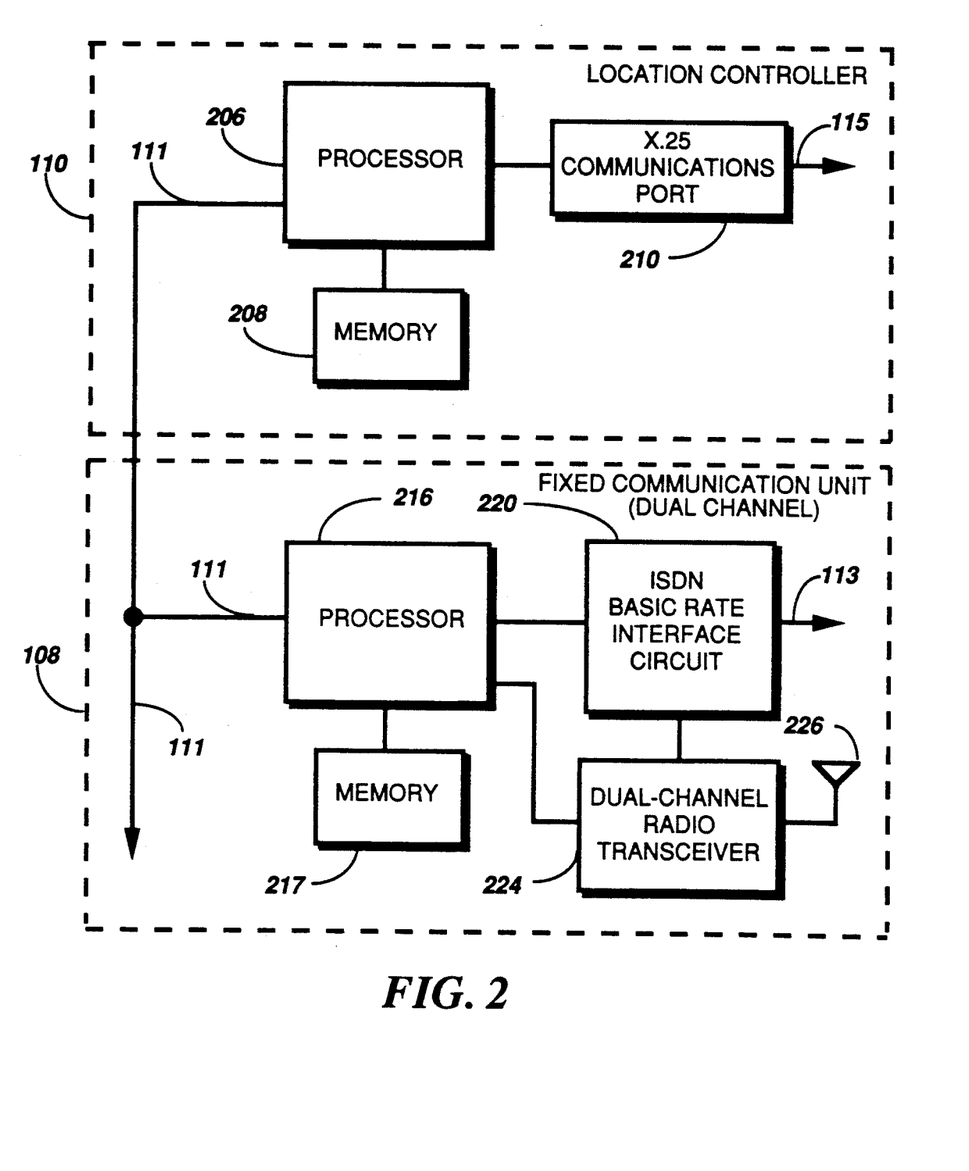
FIG. 2 is a block diagram of the LC coupled to the FCU in accordance with the preferred embodiment of the present invention.

Referring to FIG. 2, the LC comprises an X.25 communications port 210 in the LC for communicating with the RC by the X.25 link 115 coupled through the PSTN 106. The X.25 communications port 210 is coupled to a processor 206 for controlling the FCUs 108 in response to messages received by the X.25 communications port 210 and in response to software programming stored in a memory 208.

The FCU 108 comprises an ISDN BRI circuit 220 for interfacing with the ISDN BRI link 113. The BRI circuit 220 is well known in the art, an example of equipment comprising such a circuit being the MB89000 ISDN Express Card Design Kit manufactured by Mitel Corporation of Kanata, Ontario, Canada. The BRI circuit 220 is also coupled to a processor 216 for controlling the BRI circuit to process calls in response to messages from the LC 110 carried by the bus 111. The processor 216 is also coupled to a dual-channel radio transceiver 224 and antenna 226 for establishing wireless communication links between the FCU 108 and the PCUs 109. The dual-channel radio transceiver 224 is coupled to the BRI circuit 220 for transporting voice and data communications thereto and therefrom. The FCU 108 further comprises a memory 217 for storing information received from the LC 110 and software programming used in the operation of the FCU.

As will be apparent to those skilled in the art, it is possible in conjunction with certain PSTNs 106 to build a slightly modified embodiment of the wireless communication system in accordance with the preferred embodiment of the present invention. The slightly modified embodiment eliminates the X.25 link 115 coupling the LC 110 to the PSTN 106 and thence to the RC 104. This modification is possible in PSTNs 106 that can support both telephone signaling data and "bearer" data on the D channel of the BRI links 113. (Bearer data comprises data that is generated by and for an external user of the PSTN 106, as opposed to data generated by and for the PSTN 106 itself.) In the case of the modified embodiment, the LC 110 has communications with the RC 104 by a path coupled through the bus 111, at least one FCU 108, the D channel of at least one BRI link 113, and the PSTN 106. The PSTN 106 internally separates the bearer data comprising the communications and the telephone signaling data, and transports the bearer data to and from the X.25 link 114 of the RC 104, while transporting the telephone signaling data to and from the PSTN processor 105.

Those skilled in the art will recognize also that it is possible to combine the first and second communications ports 119, 121 of the RC 104 into a single communications port. The combined ports would comprise, for example, either a single BRI port or a single CCS7 port, on which the PSTN 106 would transport both the call routing communications and the bearer data.

Figure 3:
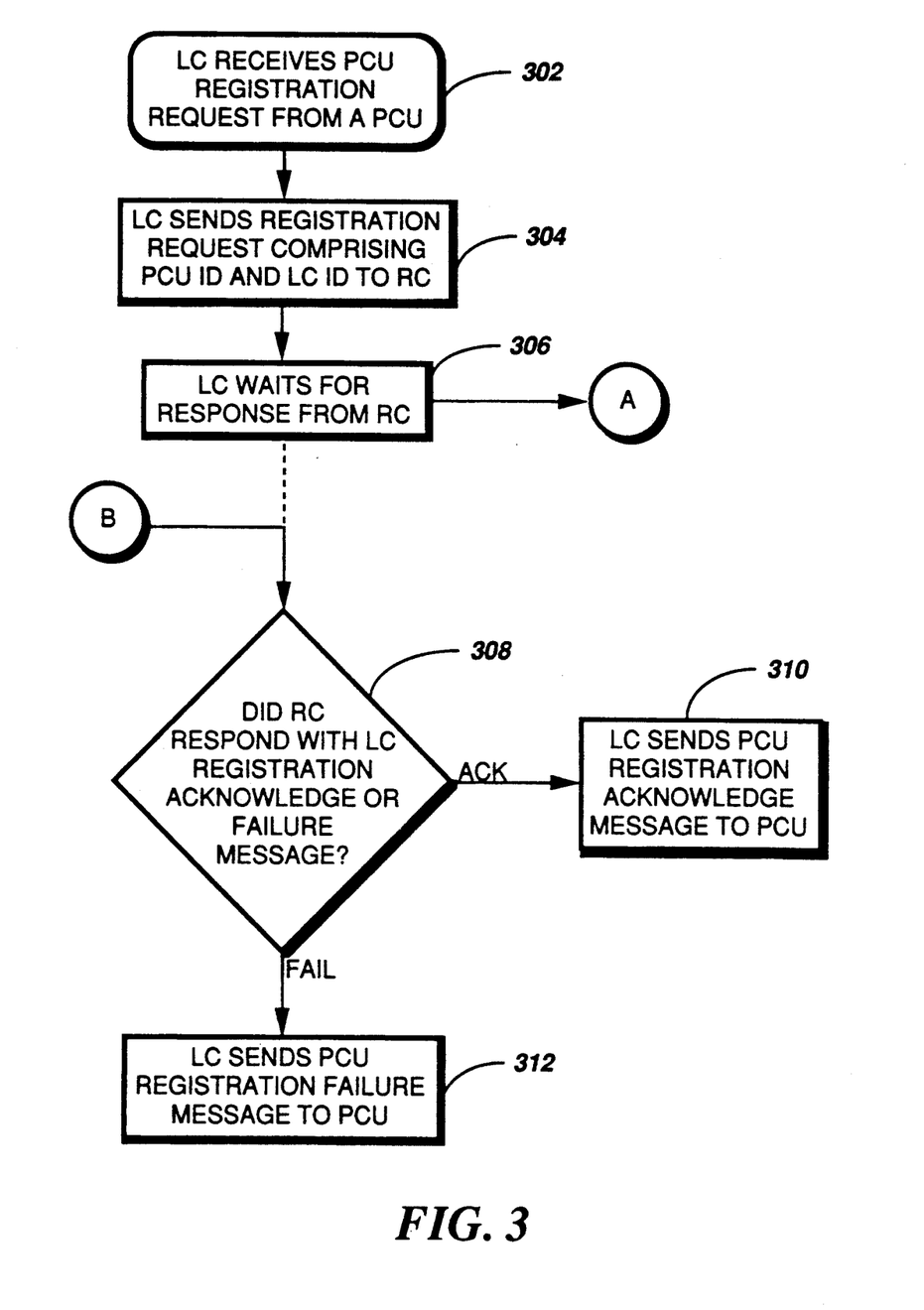
FIGS. 3 and 4 are flow charts of a method of location registration showing activities taking place in the LC and the RC, respectively, in accordance with the preferred embodiment of the present invention.
Figure 4:
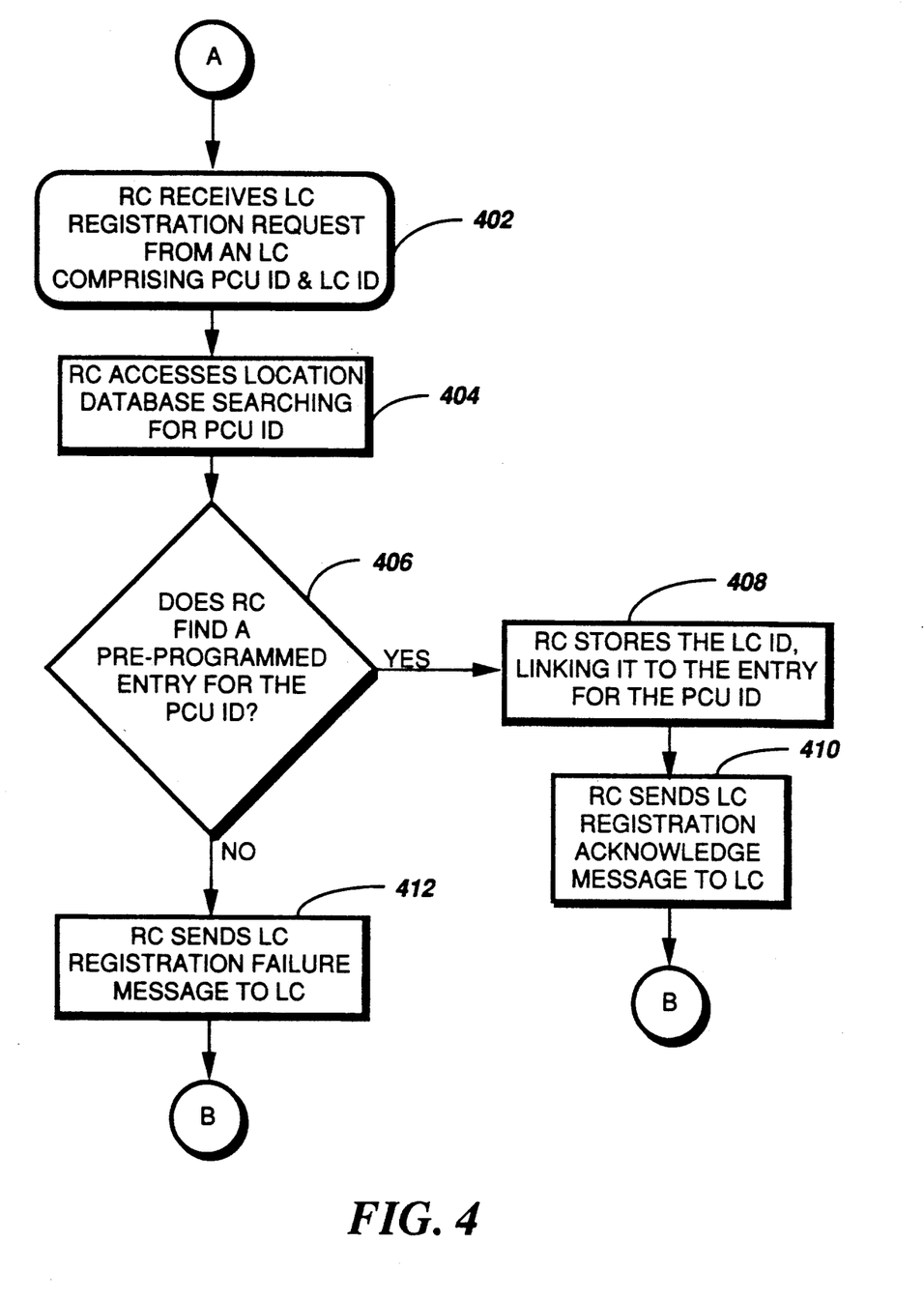

Referring to FIGS. 3 and 4, a method of location registration in preparation for future call routing using the LC 110 (FIG. 1) and the RC 104 (FIG. 1) begins with the LC receiving 302 a PCU registration request from a PCU 109 (FIG. 1). The request comprises the PCU identification code of the requesting PCU 109. In response, the LC 110 sends 304 a registration request comprising the PCU identification code and the LC identification code of the LC 110 to the RC 104. The LC 110 then waits 306 for a response from the RC 104.

While the LC 110 waits, the RC 104 receives 402 (FIG. 4) the registration request comprising the PCU identification code and the LC identification code. Next the RC 104 accesses 404 the location database 116 (FIG. 1), searching for the PCU identification code.

If the RC 104 finds in step 406 a pre-programmed identity pair comprising the PCU identification code and a corresponding PCU telephone number, the RC 104 stores 408 in the location database the LC identification code received in step 402 as the registration status code, linking the LC identification code to the entry comprising the PCU identification code and the corresponding PCU telephone number. Next the RC 104 sends 410 an LC registration acknowledge message to the LC 110.

If the RC 104 does not find in step 406 a preprogrammed entry comprising the PCU identification code and a corresponding PCU telephone number, the RC 104 sends 412 the LC 110 an LC registration failure message.

Meanwhile at the LC 110, if the LC 110 determines in step 308 (FIG. 3) that the RC 104 has responded with an LC registration acknowledge message, then the LC 110 sends 310 a PCU registration acknowledge message to the PCU that requested registration in step 302 for response thereto.

If the LC 110 determines in step 308 that the RC 104 has responded with an LC registration failure message, then the LC 110 sends 312 a PCU registration failure message to the PCU that requested registration in step 302 for response thereto.

Turning now to a description of the routing of inbound call for PCUs in accordance with the preferred embodiment of the present invention, the wireless communication system begins call routing by utilizing a capability found in modern stored program PSTN equipment. That capability is the capability of the PSTN processor 105 (FIG. 1) to be programmed in a manner such that when one of a plurality of pre-programmed telephone numbers is received by the PSTN equipment as a called number, the number will "trigger" the PSTN 106, causing it to generate a CCS7 message accessing a database that comprises information relevant to the called number, e.g., a call routing request message requesting the routing to be used to connect a caller to the called number. Usually the PSTN 106 is programmed to access a database internal to the PSTN 106, e.g., a PSTN "service control point" (SCP) database. In the wireless communication system the PSTN processor 105 is programmed to access a database external to the PSTN 106, i.e., the database 116 (FIG. 1) of the RC 104.

Figure 5:
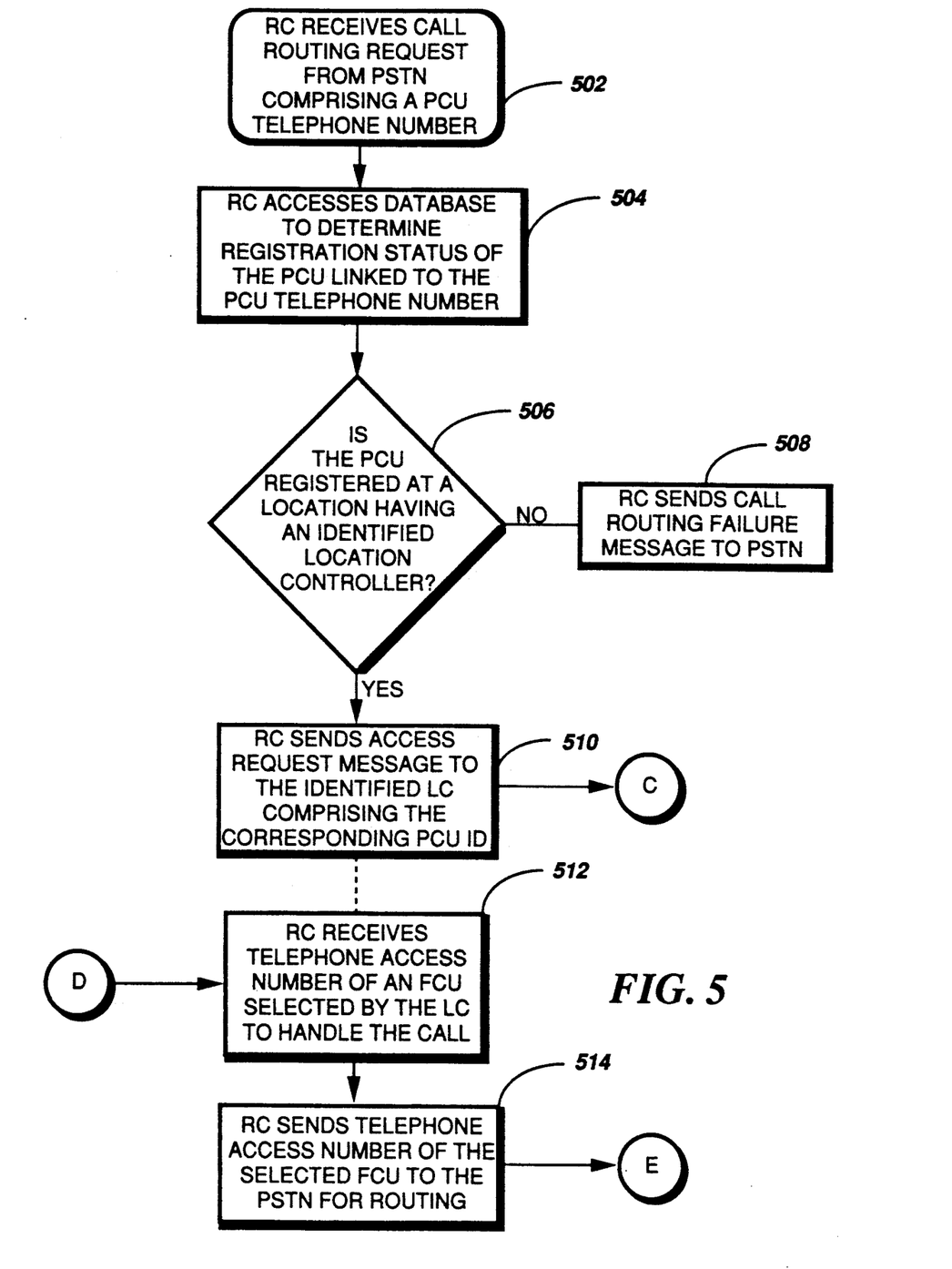
FIGS. 5 and 6 are flow charts of a method of call routing showing activities taking place in the RC and the LC, respectively, in accordance with the preferred embodiment of the present invention.
Figure 6:
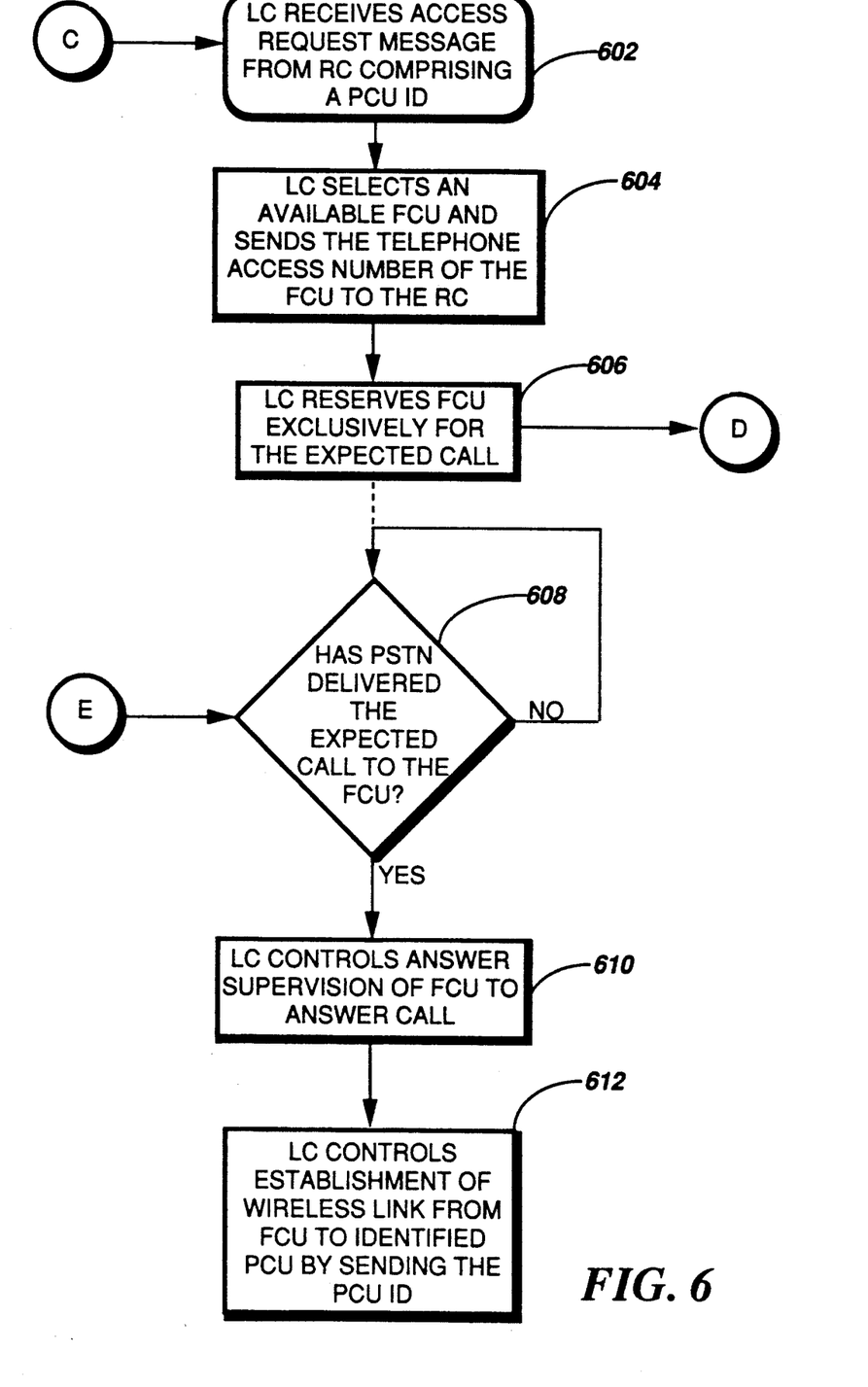

Referring to FIGS. 5 and 6, in accordance with the present invention the RC 104 (FIG. 1) receives 502 a call routing request from the PSTN 106 (FIG. 1) comprising a PCU telephone number. In response, the RC 104 accesses 504 the database 116 (FIG. 1) to search the plurality of PCU telephone numbers to determine the registration status corresponding to the PCU 109 having the PCU telephone number received in step 502.

If the RC 104 determines from the registration status code in step 506 that the PCU 109 is not registered, the RC 104 sends a call routing failure message to the PSTN 106, thus terminating the call routing process for the PCU telephone number received in step 502.

If the RC 104 determines in step 506 that the PCU 109 is registered at a location having an identified LC, the RC 104 sends 510 an access request message to the identified LC 110 comprising the PCU identification code corresponding to the PCU telephone number received in step 502.

Meanwhile at the LC 110, the LC 110 receives 602 (FIG. 6) the access request message, and in step 604 selects an available FCU 108 (FIG. 1) and sends the telephone access number of the selected FCU 108 to the RC 104. The LC 110 then reserves 606 the selected FCU 108 exclusively for the expected incoming call, i.e., the LC 110 prevents the selected FCU 108 from handling outgoing calls originated by the PCUs 109.

While the LC 110 reserves the FCU 108, the RC 104 receives 512 (FIG. 5) the telephone access number of the FCU 108. In response, the RC 104 sends 514 the telephone access number of the FCU 108 to the PSTN 106 to complete the response to the call routing request received from the PSTN 106 in step 502.

Meanwhile at the LC 110, the LC 110 is checking 608 (FIG. 6) to determine if the PSTN 106 has delivered the expected call to the FCU. When the PSTN 106 delivers the expected call, the LC 110 controls 610 answer supervision of the FCU to permit the FCU 108 to answer the call. Finally, the LC 110 controls 612 the establishment of a wireless link from the FCU 108 to the called PCU 109 by sending the PCU identification code received earlier in step 602.

Thus, it should be clear from the preceding discussion that the wireless communication system in accordance with the preferred embodiment of the present invention comprises a superior apparatus and method for directly routing inbound calls to PCUs without requiring a radio paging system including radio pagers, without requiring any additional dedicated switching equipment, and without requiring numerous additional dedicated telephone circuits. The approach used in the preferred embodiment according to the present invention maximizes use of existing PSTN capabilities in conjunction with minimal additional equipment and therefore allows a highly economical solution to the routing of inbound calls for PCUs. The approach is particularly desirable in the telepoint application, where typically there are large numbers of FCUs.

We claim:

1. A wireless communication system having a plurality of portable communication units (PCUs) each PCU having a PCU identification code and a PCU telephone number for receiving incoming calls, the wireless communication system coupled to a public switched telephone network (PSTN) for transporting calls to and from the PCUs, and having a plurality of locations, each location having a plurality of fixed communication units (FCUs), each location having a location controller (LC) for controlling the plurality of FCUs, each FCU coupled to the PSTN, each FCU having at least one transceiver channel, and each transceiver channel having a telephone access number, the wireless communication system comprising:

a routing controller (RC) for controlling the PSTN to route an incoming call for a PCU and for generating an access request message in response thereto, the RC comprising:

a location database for storing information used in controlling the PSTN to route the incoming call for the PCU;

first data communication means coupled to the location database for receiving a call routing request from the PSTN; and second data communication means coupled to the first data communication means and coupled to the location database for sending the access request message to an LC indicated by the location database to be the LC with which the PCU is registered, wherein the second data communication means receives from the LC the telephone access number of an available transceiver channel selected by the LC in response to the access request message, and wherein the first data communication means then forwards the telephone access number to the PSTN in response to the call routing request for controlling the PSTN to route the incoming call to the available transceiver channel.

2. The wireless communication system according to claim 1, wherein the location database comprises storage means for storing a plurality of values, comprising:

a plurality of PCU telephone numbers for receiving incoming calls and a plurality of corresponding PCU identification codes, each PCU identification code and PCU telephone number forming a PCU identity pair; and a plurality of reprogrammable registration status codes, each corresponding to a PCU identity pair for indicating registration status of the PCU identified by the PCU identity pair.

3. The wireless communication system according to claim 2, wherein each LC is assigned an LC identification code, and wherein each LC comprises data communication means coupled to the RC for exchanging data messages with the RC in order to control the routing of calls, and wherein each of the FCUs comprise call processing means responsive to the LC collocated with the FCUs for processing calls taking place between the FCUs and the PSTN.

4. The wireless communication system according to claim 3, wherein ones of the plurality of reprogrammable registration status codes comprise an LC identification code corresponding to an LC with which a PCU identified by a corresponding PCU identity pair is registered.

5. A wireless communication system having a plurality of portable communication units (PCUs) each PCU having a PCU identification code and a PCU telephone number for receiving incoming calls, the wireless communication system coupled to a public switched telephone network (PSTN) for transporting calls to and from the PCUs, and having a plurality of locations, each location having a plurality of fixed communication units (FCUs), each location having a location controller (LC) for controlling the plurality of FCUs, each FCU coupled to the PSTN, each FCU having at least one transceiver channel, and each transceiver channel having a telephone access number, the wireless communication system comprising:

a routing controller (RC) for controlling the PSTN to route an incoming call for a PCU and for generating an access request message in response to the incoming call, the RC comprising:

a location database for storing information used in controlling the PSTN to route the incoming call for the PCU, the location database comprising storage means for storing a plurality of values, including:

a plurality of PCU telephone numbers for receiving incoming calls and a plurality of corresponding PCU identification codes, each PCU identification code and PCU telephone number forming a PCU identity pair; and a plurality of reprogrammable registration status codes, each corresponding to a PCU identity pair for indicating registration status of the PCU identified by the PCU identity pair;

first data communication means coupled to the location database for receiving a call routing request from the PSTN and for sending a telephone access number to the PSTN in response thereto for routing the incoming call; and second data communication means coupled to the first data communication means and coupled to the location database for sending the access request message to an LC indicated by the location database to be the LC with which the PCU is registered, and for receiving the telephone access number selected by the LC in response thereto, wherein the LC at each location is assigned an LC identification code, and wherein the LC at each location comprises data communication means coupled to the RC for exchanging data messages with the RC in order to control routing of calls, and wherein each of the FCUs comprises call processing means responsive to the LC collocated therewith for processing calls taking place between the FCUs and the PSTN, and wherein ones of the plurality of reprogrammable registration status codes comprise an LC identification code corresponding to an LC with which a PCU identified by a corresponding PCU identity pair is registered.

6. In a wireless communication system having a plurality of portable communication units (PCUs) each PCU having a PCU identification code and each PCU assigned a PCU telephone number for receiving incoming calls, the wireless communication system coupled to a public switched telephone network (PSTN) for transporting calls to and from the PCUs, and having a plurality of locations, each location having a plurality of fixed communication units (FCUs), each location having a location controller (LC) for controlling the plurality of FCUs, each FCU being coupled to the PSTN, each FCU having at least one transceiver channel, and each transceiver channel having a telephone access number, a method of using the LC for establishing communications with a routing controller (RC) and controlling each of the plurality of FCUs at a location in response to an access request message generated by the RC, wherein the LC has an LC identification code, the method comprising in the RC the steps of:

(a) registering the location of a PCU in a location database in response to a registration communication from one of the LCs, comprising the steps of:

(b) receiving an LC registration request message from the LC for requesting registration of the PCU at the location of the LC, comprising the steps of:

(c) receiving the PCU identification code of the PCU; and (d) receiving therewith an LC identification code that identifies the LC sending the LC registration request message for the PCU;

(e) accessing the location database in response to step (b) to find a pre-programmed entry for the PCU identification code;

(f) storing the LC identification code in a manner that couples the LC identification code to the pre-programmed entry for the PCU identification code in response to finding the pre-programmed entry for the PCU identification code;

(g) sending an LC registration acknowledge message to the LC to acknowledge the successful completion of the registration in response to completing step (f); and (h) sending an LC registration failure message to the LC to indicate failure of the registration in response to being unable to find a pre-programmed entry for the PCU identification code;

(i) receiving a call routing request from the PSTN in response to an incoming call for a PCU, the call routing request comprising the PCU telephone number assigned to the PCU having received the incoming call;

(j) accessing the location database in response to step (i) to determine registration status of the PCU;

(k) providing call routing information in response to determining in step (j) that the PCU is registered with an LC, step (k) comprising the steps of:

(l) sending an access request message to the LC;

(m) receiving a telephone access number of a selected available FCU from the LC in response to step (l); and (n) sending the telephone access number of the selected FCU received in step (m) to the PSTN in further response to the call routing request received in step (i); and (o) providing a call routing failure message to the PSTN in response to determining in step (j) that the PCU is not registered; and in the LC the steps of:

(p) handling communications for registrations of the locations of PCUs in response to registration requests from the PCUs, comprising the steps of:

(q) receiving a PCU registration request message from a PCU requesting registration of the PCU, the PCU registration request message comprising the PCU identification code of the PCU;

(r) sending an LC registration request message to the RC in response to step (q) comprising the steps of:

(s) sending the PCU identification code of the PCU; and (t) sending therewith the LC identification code that identifies the LC;

(u) receiving the LC registration acknowledge message from the RC in response to a successful completion of the registration by the RC;

(v) receiving the LC registration failure message from the RC in response to an unsuccessful completion of the registration by the RC;

(w) sending a PCU registration acknowledge message to the PCU in response to step (u); and (x) sending a PCU registration failure message to the PCU in response to step (v);

(y) receiving at the LC the access request message from the RC, the access request message being generated in response to an incoming call for a PCU determined to be registered with the LC, comprising receiving the PCU identification code of the PCU being called;

(z) selecting an available FCU at the location of the LC for receiving the incoming call in response to step (y);

(aa) sending the telephone access number of the selected FCU to the RC in response to step (z);

(bb) controlling activities of the FCU during a period between the selection of the FCU in step (z) and an expected delivery of the incoming call to the FCU by the PSTN, comprising the steps of:

(cc) temporarily preventing the selected FCU from being used for outgoing calls; and (dd) controlling answer supervision of the selected FCU in response to delivery of the incoming call; and (ee) controlling establishment of a wireless communication link between the selected FCU and the PCU being called in response to completion of the delivery of the incoming call, comprising sending the PCU identification code of the PCU being called over the wireless communication link in response to the completion of the delivery of the incoming call.

7. In a wireless communication system having a plurality of portable communication units (PCUs) each PCU having a PCU identification code and each PCU assigned a PCU telephone number for receiving incoming calls, the wireless communication system coupled to a public switched telephone network (PSTN) for transporting calls to and from the PCUs, and having a plurality of locations, each location having a plurality of fixed communication units (FCUs), each location having a location controller (LC) for controlling the plurality of FCUs, each FCU coupled to the PSTN, each FCU having at least one transceiver channel, and each transceiver channel having a telephone access number, a method of using a routing controller (RC) coupled to a location database for controlling the PSTN to route an incoming call for a PCU and for sending an access request message to the LC with which the PCU is registered in response to the incoming call, the method comprising the steps of:

(a) registering a location of a PCU in the location database in response to a registration communication from an LC;

(b) receiving a call routing request from the PSTN in response to an incoming call for a PCU, the call routing request comprising the PCU telephone number assigned to the PCU having received the incoming call;

(c) accessing the location database in response to step (b) to determine registration status of the PCU;

(d) providing call routing information in response to determining in step (c) that the PCU is registered with an LC having a location controller ID, step (d) comprising the steps of:

(e) sending an access request message to the LC;

(f) receiving a telephone access number of a selected FCU from the LC in response to step (e); and (g) sending the telephone access number of the selected FCU received in step (f) to the PSTN in further response to the call routing request received in step (b).

8. The method according to claim 7, further comprising the step of:

(h) providing a call routing failure message in response to determining in step (c) that the PCU is not registered.

9. The method according to claim 7, wherein step (a) comprises the steps of:

(i) receiving an LC registration request message from the LC for requesting registration of a PCU at the location of the LC, comprising the steps of:

(j) receiving the PCU identification code of the PCU; and (k) receiving therewith an LC identification code that identifies the LC sending the registration request message for the PCU;

(l) accessing the location database in response to step (i) to find a pre-programmed entry for the PCU identification code;

(m) storing the LC identification code in a manner that couples the LC identification code to the pre-programmed entry for the PCU identification code in response to finding the pre-programmed entry for the PCU identification code;

(n) sending an LC registration acknowledge message to the LC to acknowledge successful completion of the registration in response to completing step (m); and (o) sending an LC registration failure message to the LC to indicate failure of the registration in response to being unable to find a pre-programmed entry for the PCU identification code.

10. In a wireless communication system having a plurality of portable communication units (PCUs) each PCU having a PCU identification code and each PCU assigned a PCU telephone number for receiving incoming calls, the wireless communication system coupled to a public switched telephone network (PSTN) for transporting calls to and from the PCUs, and having a plurality of locations, each location having a plurality of fixed communication units (FCUs), each location having a location controller (LC) for controlling the plurality of FCUs, each FCU being coupled to the PSTN, each FCU having at least one transceiver channel, and each transceiver channel having a telephone access number, a method of using the LC for establishing communications with a routing controller (RC) and controlling each of the plurality of FCUs at a location in response to an access request message generated by the RC, wherein the LC has an LC identification code, the method comprising the steps of:

(a) handling communications for registrations of the locations of PCUs in response to registration requests from the PCUs, comprising the steps of:

(b) receiving a PCU registration request message from a PCU requesting registration of the PCU, the PCU registration request message comprising the PCU identification code of the PCU;

(c) sending an LC registration request message to the RC in response to step (b), comprising the steps of:

(d) sending the PCU identification code of the PCU; and (e) sending therewith the LC identification code that identifies the LC;

(f) receiving an LC registration acknowledge message from the RC in response to a successful completion of the registration by the RC;

(g) receiving an LC registration failure message from the RC in response to an unsuccessful completion of the registration by the RC;

(h) sending a PCU registration acknowledge message to the PCU in response to step (f); and (i) sending a PCU registration failure message to the PCU in response to step (g); and (j) receiving at the LC the access request message from the RC, the access request message being generated in response to an incoming call for a PCU determined to be registered with the LC.

11. The method according to claim 10, further comprising the steps of:

(k) selecting an available FCU at the location of the LC for receiving the incoming call in response to step (j); and (l) sending the telephone access number of the selected FCU to the RC in response to step (k).

12. The method according to claim 11, further comprising the steps of:

(m) controlling activities of the FCU during a period between the selection of the FCU in step (k) and an expected delivery of the incoming call to the FCU by the PSTN; and (n) controlling establishment of a wireless communication link between the selected FCU and the PCU being called in response to completion of the expected delivery of the incoming call.

13. The method according to claim 12, wherein step (m) comprises the steps of:

(p) temporarily preventing the selected FCU from being used for outgoing calls; and (q) controlling answer supervision of the selected FCU in response to the expected delivery of the incoming call, and wherein step (n) comprises the step of:

(r) sending the PCU identification code of the PCU being called over the wireless communication link in response to the completion of the expected delivery of the incoming call.

14. The method according to claim 10, wherein step (j) comprises the step of:

(o) receiving the PCU identification code of the PCU being called.

* * * * *